US012477213B2

(12) United States Patent
Meghji et al.

(10) Patent No.: US 12,477,213 B2
(45) Date of Patent: Nov. 18, 2025

(54) METHOD FOR AUTHENTICATION OF PHYSICAL OBJECTS THROUGH CAPTURE AND PROCESSING OF FINGERPRINT DATA VIA DIGITAL ARTIFACTS

(71) Applicant: Peggy Inc., Toronto (CA)

(72) Inventors: Adam Meghji, Toronto (CA); Craig Follett, Toronto (CA)

(73) Assignee: Peggy Inc., Toronto (CA)

( * ) Notice: Subject to any disclaimer, the term of this patent is extended or adjusted under 35 U.S.C. 154(b) by 47 days.

(21) Appl. No.: 17/952,221

(22) Filed: Sep. 24, 2022

(65) Prior Publication Data

US 2023/0094557 A1 Mar. 30, 2023

Related U.S. Application Data

(60) Provisional application No. 63/248,441, filed on Sep. 25, 2021.

(51) Int. Cl.
*H04N 23/60* (2023.01)
*G06V 20/00* (2022.01)
(Continued)

(52) U.S. Cl.
CPC ............. *H04N 23/64* (2023.01); *G06V 20/95* (2022.01); *H04N 7/183* (2013.01); *H04N 23/61* (2023.01); *H04N 23/633* (2023.01)

(58) Field of Classification Search
None
See application file for complete search history.

(56) References Cited

U.S. PATENT DOCUMENTS 11,024,079 B1 * 6/2021 Chuah .................... G06T 7/246
11,417,208 B1 * 8/2022 Leung ............. G08G 1/096716
(Continued)

OTHER PUBLICATIONS

4Artechnologies, "Artwork registration with the 4ARTapp", Nov. 25, 2020, XP093017639, Retrieved from the Internet: URL: https://www.youtube.com/watch?v=KUyaK8ovr00.*
(Continued)

*Primary Examiner* — Edemio Navas, Jr.
(74) *Attorney, Agent, or Firm* — Dickinson Wright LLP; Matthew D. Powell

(57) ABSTRACT

Methods disclosed herein may be conducted as part of a process of generating a unique digital fingerprint of a physical artifact and/or to determine whether the physical artifact within a region of interest can be used for authentication/validation against a unique digital fingerprint of the physical artifact that has been generated. A method includes capturing, by a device, a current digital image of a region of interest containing a physical artifact; and presenting, by the device, an instruction to capture a next digital image of a segment of the region of interest, the instruction comprising a graphical indication of the segment generated based on the current digital image. Another method includes receiving, from a device, a current digital image captured of a region of interest containing a physical artifact; generating, based on the current digital image, data corresponding to a graphical indication of a segment of the region of interest; and transmitting, to the device, the data corresponding to the graphical indication of the segment for use by the device to present an instruction to capture a next digital image of the segment of the region of interest.

18 Claims, 6 Drawing Sheets

(51) Int. Cl.
*H04N 7/18* (2006.01)
*H04N 23/61* (2023.01)
*H04N 23/63* (2023.01)

(56) References Cited

U.S. PATENT DOCUMENTS

| | | | |
|---|---|---|---|
| 2011/0275051 A1* | 11/2011 | Hanina | G16H 20/10 |
| | | | 434/365 |
| 2014/0072201 A1* | 3/2014 | Tilt | G06V 30/2253 |
| | | | 382/140 |
| 2017/0017834 A1* | 1/2017 | Sabitov | G06V 40/172 |
| 2018/0150058 A1* | 5/2018 | Shapiro | G05B 19/4093 |
| 2019/0279390 A1* | 9/2019 | Zavesky | G06F 3/011 |
| 2020/0151537 A1* | 5/2020 | McDonald | G06Q 30/00 |
| 2020/0410278 A1* | 12/2020 | Nelson | G06F 18/22 |
| 2021/0103760 A1* | 4/2021 | Ross | H04L 9/3247 |
| 2022/0066456 A1* | 3/2022 | Ebrahimi Afrouzi | |
| | | | G06F 3/04883 |
| 2023/0076591 A1* | 3/2023 | Chow | G06T 19/00 |

OTHER PUBLICATIONS

Extended European Search Report Dated Feb. 7, 2023 in EP22197661.6 (European Patent Office).
4artechnologies: "Artwork registration with the 4ARTapp", Nov. 25, 2020 (Nov. 25, 2020), XP093017639, Retrieved from Internet: URL: https://www.youtube.com/watch?v=KUyaK8ovr00.
"A Clustering Algorithm to Discover Low and High Density Hyper-Rectangles in Subspaces of Multidimensional Data" (Ordonez, 1999; College of Computing Technical Reports [506]).
"A Comparative Analysis of SIFT, SURF, KAZE, AKAZE, ORB, and BRISK" (Tareen, 2018; Institute of Electrical and Electronics Engineers).

* cited by examiner

METHOD FOR AUTHENTICATION OF PHYSICAL OBJECTS THROUGH CAPTURE AND PROCESSING OF FINGERPRINT DATA VIA DIGITAL ARTIFACTS

CROSS-REFERENCE TO RELATED APPLICATION

This application claims priority to U.S. Provisional Patent Application Ser. No. 63/248,441 filed on Sep. 25, 2021, the contents of which are incorporated herein by reference.

FIELD OF THE INVENTION

The following relates generally to authentication of physical artifacts such as artwork, and particularly to processes and systems for automatically authenticating physical artifacts using digital image capture and processing, which may be used for the creation or maintenance, of non-fungible tokens (NFTs), registries, registrations, or the like, that may uniquely represent physical artifacts or a specific fractionalized region or regions of such physical artifacts.

BACKGROUND OF THE INVENTION

Authentication of original physical artifacts, such as original artworks, can present a challenging problem. An original physical artifact regarded as valuable is particularly susceptible to counterfeiting. It can be extremely difficult, however, particularly for a non-expert or any casual observer, to distinguish a high quality counterfeit physical artifact from an original physical artifact of which it is a copy.

Where an original physical artifact has a sufficiently high value, the opinion of an expert may be sought by a potential buyer and/or other stakeholders to confirm its authenticity. The buyer and any other stakeholders may thereby be assured that it is indeed the original physical artifact. Such an expert may have historical knowledge of the provenance of the original physical artifact, may have once studied the actual original physical artifact in person, and may have other skills and/or knowledge to aid the authentication process and to provide stakeholders with a confirmation of authenticity.

Retaining an expert can be expensive and time-consuming. This may be justifiable and important for cases of high-value and/or historically-important transactions of physical artifacts. However, this may not be justifiable in other cases. To address the problem of authenticating physical artifacts in other cases, a printed certificate of authenticity may accompany or be affixed to an original physical artifact to help assure a buyer that the physical artifact being purchased is authentic. While a certificate of authenticity may provide sufficient assurance in certain cases, it can itself be easy to counterfeit.

It is an object of an aspect of the present description to provide a technical solution to the problem of authenticating physical artifacts, which technical solution may be useful in other applications.

SUMMARY OF THE INVENTION

In the present description, digital imaging is used in a particular way to capture particular information about a physical artifact. Such information may be used for various purposes, including for the creation of a digital fingerprint of the physical artifact itself, and/or for use in determining whether the physical artifact can be successfully authenticated against a digital fingerprint of an original physical artifact that had been previously produced. Methods and systems described herein may be useful for enabling non-expert, casual, or any other person or system to determine whether a particular physical artifact in their presence is itself the same as, or different from, a physical artifact to which a particular previously-generated unique digital fingerprint pertains. Methods and systems described herein may be used to enable such people to confidently assure themselves that a physical artifact in their presence is genuine and/or is the physical artifact they believe it to be. Other uses of the methods and systems described herein are possible.

One aspect described herein is a method including capturing, by a device, a current digital image of a region of interest containing a physical artifact. The method includes presenting, by the device, an instruction to capture a next digital image of a segment of the region of interest, the instruction comprising a graphical indication of the segment generated based on the current digital image.

Another aspect described herein is a method including receiving, from a device, a current digital image captured of a region of interest containing a physical artifact. The method further includes generating, based on the current digital image, data corresponding to a graphical indication of a segment of the region of interest. The method further includes transmitting, to the device, the data corresponding to the graphical indication of the segment for use by the device to present an instruction to capture a next digital image of the segment of the region of interest.

In embodiments, the generating includes processing the current digital image to identify at least one high entropy area ("hotspot") in the current digital image, wherein the data corresponding to the graphical indication of the segment identifies one hotspot. In embodiments, the generating includes processing the current digital image to identify at least one low entropy area ("coldspot") in the current digital image, wherein the data corresponding to the graphical indication of the segment identifies one coldspot.

During identifying at least one high entropy or low entropy area in the digital image, feature processing to detect feature keypoints may be employed. During feature processing for detecting feature keypoints, one or more different feature detection processes may be employed and/or one or more different tunings of a particular feature detection process may be employed. Feature detection may therefore be conducted using what may be referred to as a feature detection "jury" of one or more different feature detection processes and/or one or more different tunings of a particular feature detection process.

Methods described herein may be conducted to generate a unique digital fingerprint of a physical artifact that is within the region of interest, thereby to enable subsequent authentication of the physical artifact. Methods described herein may be conducted to determine whether a physical artifact within the region of interest can be matched with a previously-generated unique digital fingerprint of the physical artifact, thereby to authenticate the physical artifact.

Other aspects and embodiments will become apparent upon reading the following description.

DESCRIPTION

Figure 1:
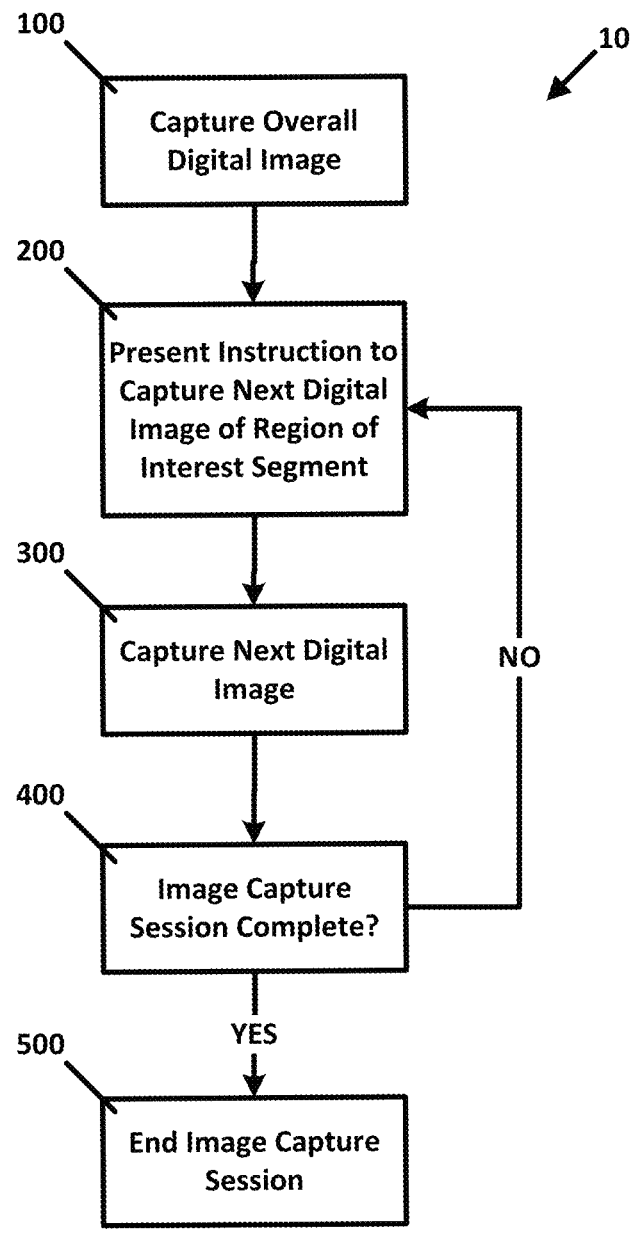
FIG. 1 is a flowchart showing steps in a method of using a device to create a unique digital fingerprint of a physical artifact, according to an embodiment.

FIG. 1 is a flowchart showing steps in a method 10 of using a device to create a unique digital fingerprint of a physical artifact, according to an embodiment. An artist or authorized artist representative may initiate the creation of the unique digital fingerprint of an original artwork, such as a painting or drawing. The method may be implemented on a device such as a smartphone having an image capture device such as a camera, and which is equipped with a software application for assisting with image capture and for presenting instructions to a user.

In this embodiment, during an image capture session, a current digital image of a region of interest (step 100) is captured using the device, and an instruction to capture a next digital image of a segment of the region of interest (step 200) is presented by the device. In this description, the first digital image captured during an image capture session, such as an image capture session for creating a unique digital fingerprint of a physical artifact, is referred to as an overall digital image. An overall digital image is meant to capture the overall physical artifact within the image capture field of view of the device.

For example, if the physical artifact for which the digital fingerprint is being created is a painting, the overall digital image includes the overall painting within the image capture field of view of the device. It will be appreciated by persons of ordinary skill that the outer framing of an image being captured may be referred to as a landmark. During capture of the overall digital image, the device may be located and oriented with respect to the physical artifact so that the physical artifact substantially fills the image capture field of view of the device. In this way, the overall digital image may include very little, or no, other content besides the physical artifact itself. In some embodiments, digital images captured by an image capture device may themselves be single-capture images. In some embodiments, current and next digital images may each composite digital images each formed as a result of multiple captures. For example, a digital image may be formed from multiple image captures that are stitched together. As another example, a current digital image may be formed from multiple image captures that are overlaid on each other.

Instructions presented on the device to a user may include instructions to crop out any content in the overall digital image that is not attributable to the physical artifact. Cropping can be done by providing a user interface control enabling a user to bring the contours of the overall digital image adjacent to the physical artifact being represented within the overall digital image. In this way, content in the overall digital image that is not attributable to the physical artifact can be substantially removed from the overall digital image by the user.

Furthermore, it is preferred particularly for the overall image that the physical artifact be represented as fully within the focus plane of the image capture device as possible, so that little of the physical artifact is represented as blurry or skewed in the overall image. Automatic processing may be provided to process the overall image to determine whether there is a threshold amount of blurring and/or apparent skew. In the event that there is a threshold amount of blurring and/or apparent skew, the user may be requested to re-capture the overall image. Furthermore, the overall image may be processed to identify shadows or other extreme or differential lighting effects that are not inherent to the physical artifact but that are due to differential lighting being imparted onto the physical artifact. In some embodiments, such automatic processing is conducted at least partially on the image capture device. In some embodiments, such automatic processing is conducted at least partially by another device, such as a server.

The user may be requested to change the lighting (more or less lighting to avoid saturation/exposure effects and/or more uniform lighting to avoid incorrect feature identification) and or orientation of the image capture device in order to provide a sufficiently sharp, sufficiently unskewed, and sufficiently lighted and sufficiently uniformly lighted digital image of physical artifact. Such automatic processing may additionally be done at successive iterations of image capture, as a user physically approaching—or "landmarking"—the physical artifact may inadvertently impart a shadow on the physical artifact, or may otherwise capture light being imparted differently or differentially onto the physical artifact.

In this description, during a first iteration of image capture in the image capture session, the overall image is referred to as the current image. Due to the potential for iterative image captures during the image capture session, in a next iteration of image capture in the image capture session, the next digital image that had been captured will be referred to as the current digital image and yet another digital image to be captured is then called the next digital image.

In this embodiment, to assist with the method of creating a unique digital fingerprint, prior to the image capture session a user is requested to enter, into the device, dimensional details of the physical artifact, such as its height, width and thickness, in units such as centimetres or inches. Such dimensional details are used to correlate actual size of the physical object to the size of the overall image, and to derive the actual size(s) of successive segments of the region of interest during respective iterations of image capture.

For example, if the overall image is captured at a resolution of 4032 pixels in width by 3024 pixels in height, and the user specifies that a square-shaped physical artifact is 100 inches in width and 100 inches in height, then it can be inferred that each inch in width of the physical artifact is represented in the overall image by about 40 pixels and each inch in height of the physical artifact is represented by about 30 pixels. Accordingly, it can be inferred that a segment of the region of interest that is calculated to represent about 2000 pixels by about 1500 pixels of the overall image will represent about a 50 inch×50 inch segment of the physical artifact. Once the next digital image of that segment of the region of interest is captured at a pixel resolution of 4032 pixels in width by 3024 pixels in height, it can automatically be determined that each inch in width of the portion of the physical artifact captured in the next digital image is represented by about 80 pixels and that each inch in height of the portion of the physical artifact is represented by about 60 pixels. Provided that the zoom feature of the image capture device is not used, it will be appreciated that (in this example) at this iteration each inch of the physical artifact is being represented at double the resolution as it had been in the previous iteration.

Accordingly, it can be inferred that a segment of the region of interest that is calculated to represent about 2000 pixels by about 1500 pixels of the next digital image will represent about a 25 inch×25 inch segment of the physical artifact. It will be appreciated that next and subsequent digital images will, in this way, iteratively hone in on segments of the physical artifact to capture successive segments of the physical artifact at successively higher resolutions thereby to progressively more closely capture physical details of the physical artifact.

The user may be instructed not to use the zoom feature of the device when capturing successively images. Alternatively, the zoom feature may be automatically disabled so that the user cannot use it. In this way, the user is required to approach the region of interest during successive iterations of image capture, rather than to zoom in on it. By requiring the user to physically approach—or "landmark"—the region of interest—and in particular the physical artifact—for successive image captures, the device will be successively capturing higher and higher resolution images of smaller and smaller portions of the physical artifact itself. In this way, greater and greater optical detail about the physical aspects of the physical artifact can be captured using the device.

In this embodiment, the image capture session is completed when it is determined that the segment of the region of interest would capture less than a 3-inch×2-inch segment of the physical artifact. It will be appreciated that, generally-speaking, a very large physical artifact will require a higher number of iterations from overall image to ending of the image capture session to reach this lower size limit than will a smaller physical artifact. For example, a very large physical artifact may require seven (7) image captures whereas a smaller physical artifact may require three (3) image captures. If the physical artifact is itself very small—for example is 3-inches×2-inches or smaller —then only a single iteration may be required.

Other methods of capturing physical dimensional detail may be employed, such as by deploying a LIDAR sensor implemented on the device to assist with automatically obtaining the physical dimensions of the physical artifact.

The instruction for a user includes a graphical indication of the segment generated based on the current digital image. The graphical indication is any indication that sufficiently directs the user of the device to move towards the region of interest in order to fill the image capture field of view of the device with just the segment of the region of interest specified in the instruction. In an embodiment, the graphical indication of the segment is a graphical representation of the segment such as a part of the current digital image.

In another embodiment, the graphical representation of the segment is a graphical outline of a respective portion of the current digital image, such as a rectangular box encompassing only a portion of the current digital image. Alternative graphical indications for guiding the user as to which segment of the region of interest should fill the image capture field of view of the device may be provided. Furthermore, automatic feedback during an image capture session may be provided to a user as the user aims the image capture field of view towards the segment of the region of interest, thereby to guide the user to the instructed position and orientation so he or she can "register" that which is captured within the image capture field of view of the device with the segment.

In this embodiment, pursuant to the instruction being presented, the next digital image is captured (step 300). In the event it is determined that the image capture session is complete (step 400) then the image capture session is ended (step 500). An image capture session may be complete if it is determined that additional image captures are not required or are not desirable, for generating a unique digital fingerprint of the physical artifact.

Otherwise, another iteration of image capture continues from step 200 with the instruction including a graphical indication of the segment having been generated based on the next digital image that had been captured during step 300.

The overall digital image, next digital image and subsequently captured digital images during an iterated image capture session are associated with each other in an array as a capture set.

In this embodiment, each digital image captured by the device is transmitted to a server for processing prior to presenting the instructions. Based on the processing, the device receives data from the server corresponding to the graphical indication of the segment. In this embodiment, the server itself generates the data corresponding to the graphical indication of the segment. In particular, in an embodiment, a digital image received by the server is processed to identify at least one high entropy area (or "hotspot") in the digital image. The data corresponding to the graphical indication of the segment identifies one such hotspot. In another embodiment, the digital image received by the server is processed to identify at least one low entropy area (or "coldspot") in the digital image. The data corresponding to the graphical indication of the segment identifies one such coldspot.

The server may return actual digital image data to the device, or may alternatively return data simply defining the dimensions and position of the graphical indication of the segment with respect to the current digital image being processed. For example, if a hotspot is determined to be a small rectangular area in the middle of the current digital image that is 200 pixels×300 pixels, then data corresponding to the graphical indication of the segment may be data specifying a rectangle having 200 pixels×300 pixels centred at a position X,Y with respect to the current digital image. Such data may then be used by the device to present the whole of the current digital image with an overlaid rectangle of these dimensions and position, thereby to guide the user to fill the image capture field of view with just the segment of the region of interest corresponding to the content overlaid by the rectangle. Alternatives are possible.

Figure 2:
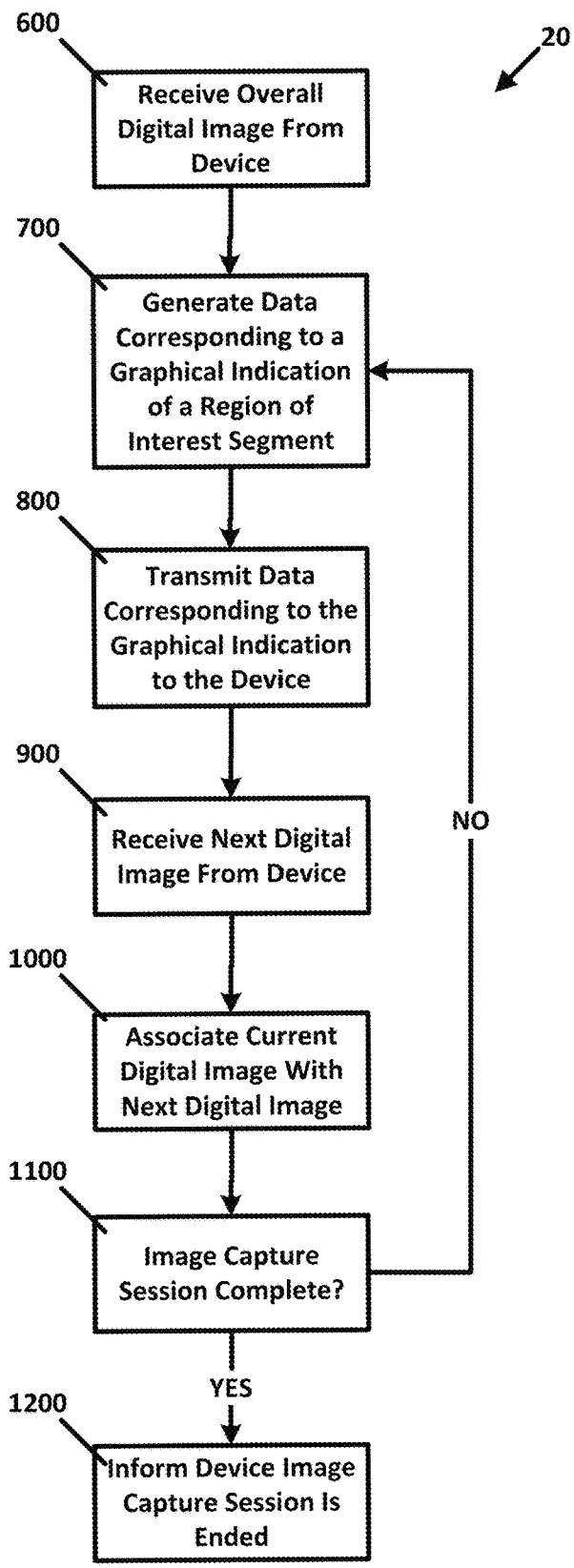
FIG. 2 is a flowchart showing steps in a method of generating an image capture set, according to an embodiment.

FIG. 2 is a flowchart showing steps in a method 20 of using a server to generate an image capture set for the unique digital fingerprint of the physical artifact, according to an embodiment.

In this embodiment, during an image capture session, an overall digital image captured of a region of interest is received from the device (step 600). Then, data corresponding to a graphical indication of a segment of the region of interest is generated (step 700). The data corresponding to the graphical indication of the segment is then transmitted to the device (step 800), so that the device may use the data to present its instruction to capture a next digital image of the segment of the region of interest.

In this embodiment, during the generating, the current digital image is processed to identify at least one high entropy area ("hotspot") in the current digital image, wherein the data corresponding to the graphical indication of the segment identifies one hotspot. Furthermore, in this embodiment, the current digital image is processed to identify at least one low entropy area ("coldspot") in the current digital image, wherein the data corresponding to the graphical indication of the segment identifies one coldspot.

In an embodiment, the data corresponding to the graphical indication of the segment is digital image data. Alternatively, the data corresponding to the graphical indication of the segment is data defining dimension and position of the graphical indication of the segment with respect to the current digital image.

After data corresponding to the graphical indication of the segment is transmitted to the device at step 800, a next digital image is received from the device (step 900) and associated with the current digital image in an image capture set (step 1000). In the event it is determined that the image capture session is complete (step 1100) then the device is informed that the image capture session is ended (step 1200). An image capture session may be complete if it is determined that additional image captures are not required or are not desirable, for generating a unique digital fingerprint of the physical artifact.

Otherwise, another iteration of image capture continues from step 700 with the instruction including a graphical indication of the segment having been generated based on the next digital image that had been received during step 900.

A high entropy area, or "hotspot", is an area of the current image having a concentration of information, such as an area with relatively high amounts of creative detail, such as quickly changing contrasts. For a physical artifact that is a painting, a hotspot may be an area encompassing at least part of a subject's bangs, a wig, wisps of hair, or other areas of high amounts of creative detail.

A low entropy area, or "coldspot", is an area of the current image that has diffuse information, such as an area with relatively low amounts of creative detail, such as low or slowly changing contrasts. For a physical artifact that is a painting, a coldspot may be an area encompassing at least part of a shadow, a clear blue sky, or an unpainted region of a canvas.

It will be appreciated that hotspots and coldspots, once identified, may be processed differently from each other using different image processing techniques. For example, for a physical artifact that is a painting, a hotspot may be processed generally with a view to identifying creative features imparted by the artist, whereas a coldspot may be processed with a view to identifying non-creative features such as bumps in a canvas, or the texture or material of the canvas. It will be appreciated that a process of uniquely fingerprinting and subsequently identifying a physical artifact may determine such hotspot and coldspot features thereby to uniquely identify the physical artifact itself as distinct from a physical reproduction which may be absent of a sufficient number of the hotspot and coldspot features to distinguish it from the original.

Hotspot processing may be oriented generally more towards identifying creative features of the physical artifact and coldspot processing may be oriented generally towards identifying non-creative features of the physical artifact. However, these are not intended to be always mutually exclusive. For example, hotspot processing may not necessarily preclude the identification of non-creative features and coldspot processing may not necessarily preclude the identification of creative features. Rather, it may be that hotspot processing tends towards or is oriented towards, but is not exclusive to, identification of creative features and coldspot processing tends towards or is oriented towards, but is not exclusive to, identification of non-creative features.

Both hotspot and coldspot processing involves detecting and/or processing clusters of features within sliced regions of the current digital image. The number of rows and columns into which a current digital image is divided to form the sliced regions may be determined automatically based on the physical dimensions of the physical artifact and the derived physical dimensions of the subsequent digital images captured during an image capture session. Upper and lower thresholds may be established to set bounds on numbers of rows and/or columns. In some embodiments, other processing in addition to hotspot and coldspot processing, may be conducted.

In this embodiment, feature processing is conducted in order to detect feature keypoints in a current digital image. Various techniques or processes for detecting features in digital images are available. Various configurations of hardware and software are available for conducting feature processing. Furthermore, feature processing or elements of feature processing may be conducted using an Application Specific Integrated Circuit (ASIC), or some other hardware processor or a software defined processor. The coordinates of the feature keypoints in the current digital image are stored in association with the current digital image. Hotspot and coldspot areas are then determined by processing the feature keypoints and their concentration or diffusiveness, and the coordinates are employed to determine the segment of the region of interest to capture during the next iteration of image capture.

As described above, during feature processing for detecting feature keypoints, one or more different feature detection processes may be employed and/or one or more different tunings of a particular feature detection process may be employed. Feature detection may therefore be conducted using what may be referred to as a feature detection "jury" of one or more different feature detection processes and/or one or more different tunings of a particular feature detection process. In this description, tuning refers to configuration of a feature detection process in a particular way according to one or more feature detection parameters.

Such a feature detection jury may consist of a single feature detection process, thereby to function as a jury of only one juror. For example, a feature detection jury may consist simply of feature detection process 1. Such a feature detection process may have a particular respective tuning.

Alternatively, a feature detection jury may consist of more than one instance of a particular feature detection process, with each instance tuned in respective different ways, thereby to together function as jury of multiple jurors. For example, a jury may consist of an instance of feature detection process 1 having a first tuning, and an instance of feature detection process 1 having a second, different tuning. As another example, a jury may consist of an instance of feature detection process 1 having a first tuning, an instance of feature detection process 1 having a second and different tuning, and an instance of feature detection process 1 having a third and still different tuning. It should be appreciated that a feature detection jury may consist of more than three instances of a particular feature detection process, each having respective, different tuning.

Alternatively, a feature detection jury may consist of multiple different feature detection processes, thereby to function as a jury of multiple jurors. For example, a jury may consist of an instance of feature detection process 1 and an instance of feature detection process 2. As another example, a jury may consist of an instance of feature detection process 1, an instance of feature detection process 2, and an instance of feature detection process 3. A feature detection jury may consist of instances of more than three feature detection processes.

Alternatively, a feature detection jury may consist of multiple different feature detection processes and, for one or more of the different feature detection processes, more than one instance of the particular feature detection process, with each instance tuned in respective different ways, thereby to together function as a jury of multiple jurors. For example, a jury may consist of an instance of feature detection process 1 having a first tuning, an instance of feature detection process 1 having a second, different tuning, and an instance of feature detection process 2 having a respective tuning. As another example, a jury may consist of an instance of feature detection process 1 having a first tuning, an instance of feature detection process 1 having a second, different tuning, an instance of feature detection process 2 having a third tuning, and an instance of feature detection process 2 having a fourth tuning that is different from the third tuning. A feature detection jury may consist of instances of more than two feature detection processes and/or of more than two respective tunings of a particular feature detection process.

A jury of multiple jurors may, by providing a diversity of feature detection approaches, provide improved feature detection and accordingly improved quality and integrity when generating a unique digital fingerprint for a particular physical artifact as well as improved quality and integrity during authentications of the physical artifact.

In some embodiments, the server is configured to have two main components for use in creating unique digital fingerprints and for validating images of a physical artifact against the unique digital fingerprints. The first is configured to conduct feature extraction and match detection. The second is configured to act as a microservice, interfacing with other backend subsystems. This microservice may use an API (Application Programming Interface) to interface with the other systems and to conduct validation of feature data and to handle other business logic. Various API implementations are available. Other implementations are possible.

The segment of a region of interest for which data is generated may indicate a hotspot, such that the user of the device is instructed to capture within the image capture field of view of the device a portion of the physical artifact that corresponds to a hotspot. The segment of a region of interest for which data is generated may indicate a coldspot, such that the user of the device is instructed to capture within the image capture field of view of the device a portion of the physical artifact that corresponds to a coldspot. In two successive iterations of image capture during an image capture session, the data may indicate a first hotspot and then a second hotspot within the first hotspot.

Alternatively, in two successive iterations of image capture during an image capture session, the data may indicate a first hotspot and then a first coldspot within the first hotspot. Alternatively, in two successive iterations of image capture during an image capture session, the data may indicate a first coldspot and then a first hotspot within the first coldspot. Alternatively, in two successive iterations of image capture during an image capture session, the data may indicate a first coldspot and then a second coldspot within the first coldspot. It will be appreciated that hotspots and coldspots may be determined based on relative entropy within a particular image.

In an embodiment, an image capture set captured during an image capture session may be characterized as a hotspot image capture set. In such an embodiment, once an overall image is received the successive segments of the region of interest include a hotspot, a hotspot within a hotspot, a hotspot within a hotspot within a hotspot, and so forth.

Similarly, in an embodiment, an image capture set captured during an image capture session may be characterized as a coldspot image capture set. In such an embodiment, once an overall image is received the successive segments of the region of interest include a coldspot, a coldspot within a coldspot, a coldspot within a coldspot within a coldspot, and so forth.

Alternatively, in an embodiment, for each current digital image, both at least one coldspot and at least one hotspot may be identified and associated with a respective image set, with only the data corresponding to one hotspot or one coldspot being transmitted to the device for the purpose of instructing a user as to the next digital image to capture during the image capture session. As such, while a user may be instructed based on only one of these during a given iteration, both a coldspot image set constituted of one or more coldspots and a hotspot image set constituted of one or more hotspots may continue to be built up in respect of a given physical artifact.

During initial creation of a fingerprint, a user may be requested to repeat an image capture session thereby to validate the captures done a second time against the captures done the first time. In the event that such validation cannot be done, the capture set(s) are rejected and the user is asked to attempt the creation of the unique digital fingerprint of the physical artifact anew.

It will be appreciated that processing a current digital image may include globally or locally processing the current digital image prior to hotspot/coldspot identification and prior to feature identification. For example, a current digital image may be first converted from RGB colour to greyscale or black and white, or may be processed in other ways to produce a processed current digital image that is suitable for downstream processing.

During validation of a physical artifact—at some time after the unique digital fingerprint of the physical artifact has been generated—the Linux binary deploys a feature detection process by attempting to locate the presence of an object digital image (a candidate being checked for validation) within a scene digital image (the canonical capture image represented by the capture set, and thus the unique digital fingerprint). In this embodiment, validation includes preprocessing the scene and object images. Preprocessing may include converting the scene and object digital images to greyscale, so that only contrast is considered during validation. Keypoints and features are then extracted from both the scene and object digital images, thereby to create scene keypoints and object keypoints. In the event that keypoints cannot be detected, as could happen if there is a poor image capture, then an exception is raised so that a better digital image can be captured for the processing. Matches between the scene keypoints and object keypoints are then computed. In the event that less than a threshold number of matches is determined, then an exception is raised indicating that there is no match between the scene and object digital images.

Otherwise, in the event that at least a threshold number of matches is determined, it is then determined whether a homography between the scene keypoints and the object keypoints can be found. In the event that no such homography can be found, then an exception is raised indicating that there is no match between the scene and object digital images. Otherwise, in the event that a homography can be found, and can be expressed in a homography transformation matrix, the four corners of the homography transformation matrix are extracted for validation. During validation, in this embodiment it is determined whether the homography matrix represents a trapezoid with an internal angle sum between 360° with a forgiveness for a tolerable variance such as 10°, and a rejection if any one such angle is too acute such as less than 40°. While a particular tolerance level and a particular level of acuteness has been described, it will be appreciated by the skilled reader that other tolerance levels and levels of acuteness could be used without departing from the purpose of this description.

It is thereby determined that such geometry is a trapezoid valid within tolerances, thereby to rule out any homography projections that would be uncharacteristic of a match between and object digital image and a scene digital image, such as a twisted or semi-inverted homography, or one that indicates digital image contents compressed into a straight line. In the event that validation of the homography matrix succeeds, a match between the scene digital image and the object digital image is registered and the physical object is deemed the same physical object captured during creation of the unique digital fingerprint data. The server then informs the device that, in turn, presents feedback to the user of the device that the physical artifact is confirmed.

Otherwise, an exception is raised indicating that there is no match between the scene and object digital images, and the feedback presented to the user of the device is that the physical artifact is not confirmed.

Figure 3:
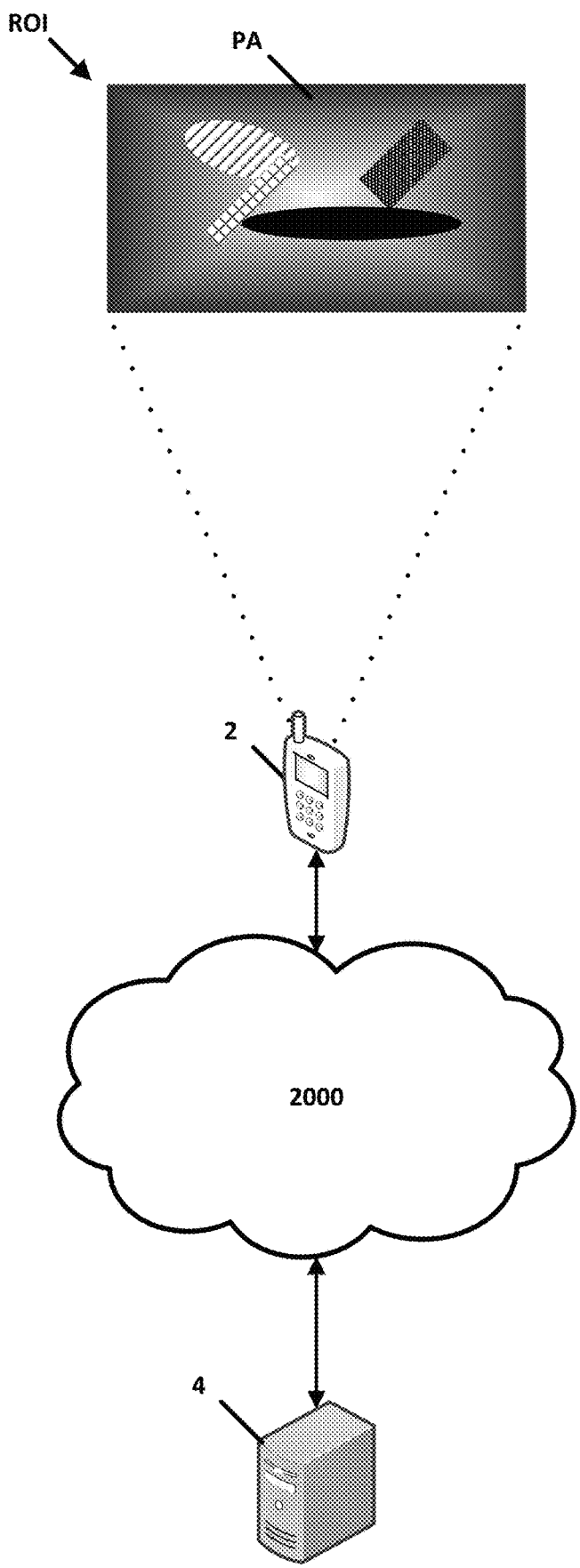
FIG. 3 is a diagram of a device having within its image capture field of view a region of interest containing a physical artifact, and in communication with a server via a network.
Figure 4:
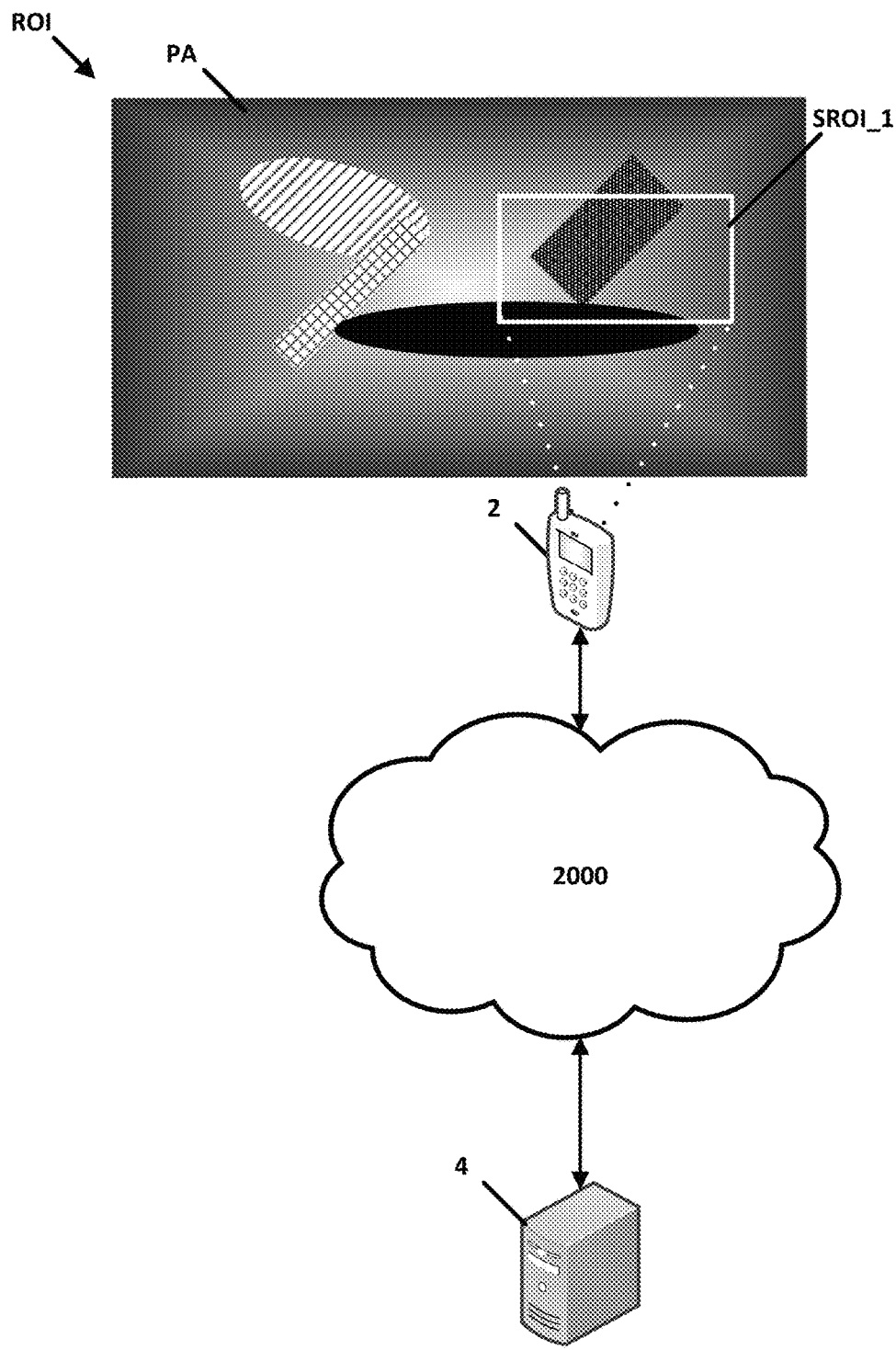
FIG. 4 is a diagram of the device having approached the physical artifact and having with its image capture field of view a segment of the region of interest of FIG. 3.
Figure 5:
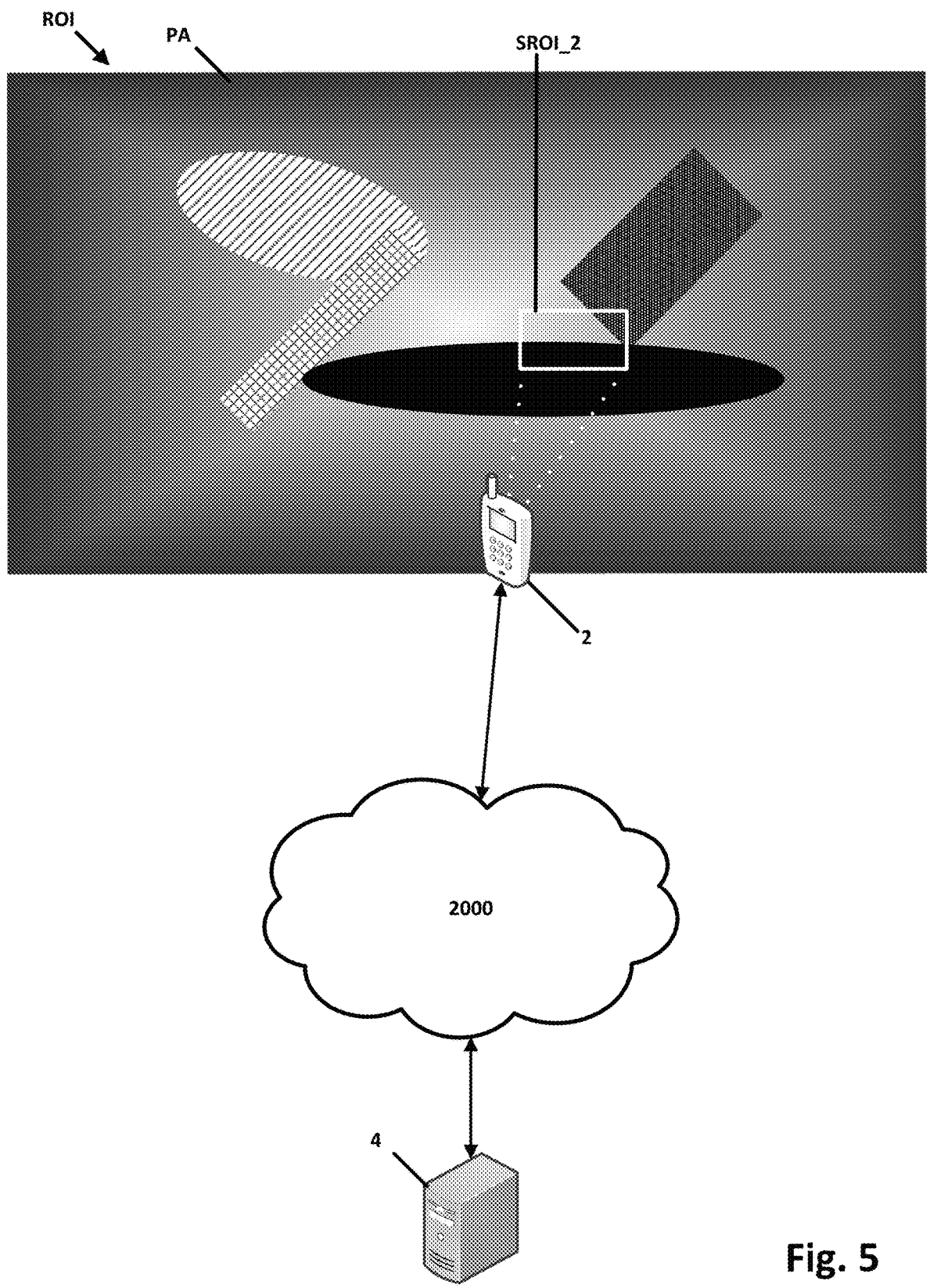
FIG. 5 is a diagram of the device having further approached the physical artifact and having within its image capture field of view another segment of the segment of the region of the interest of FIG. 4.
Figure 6:
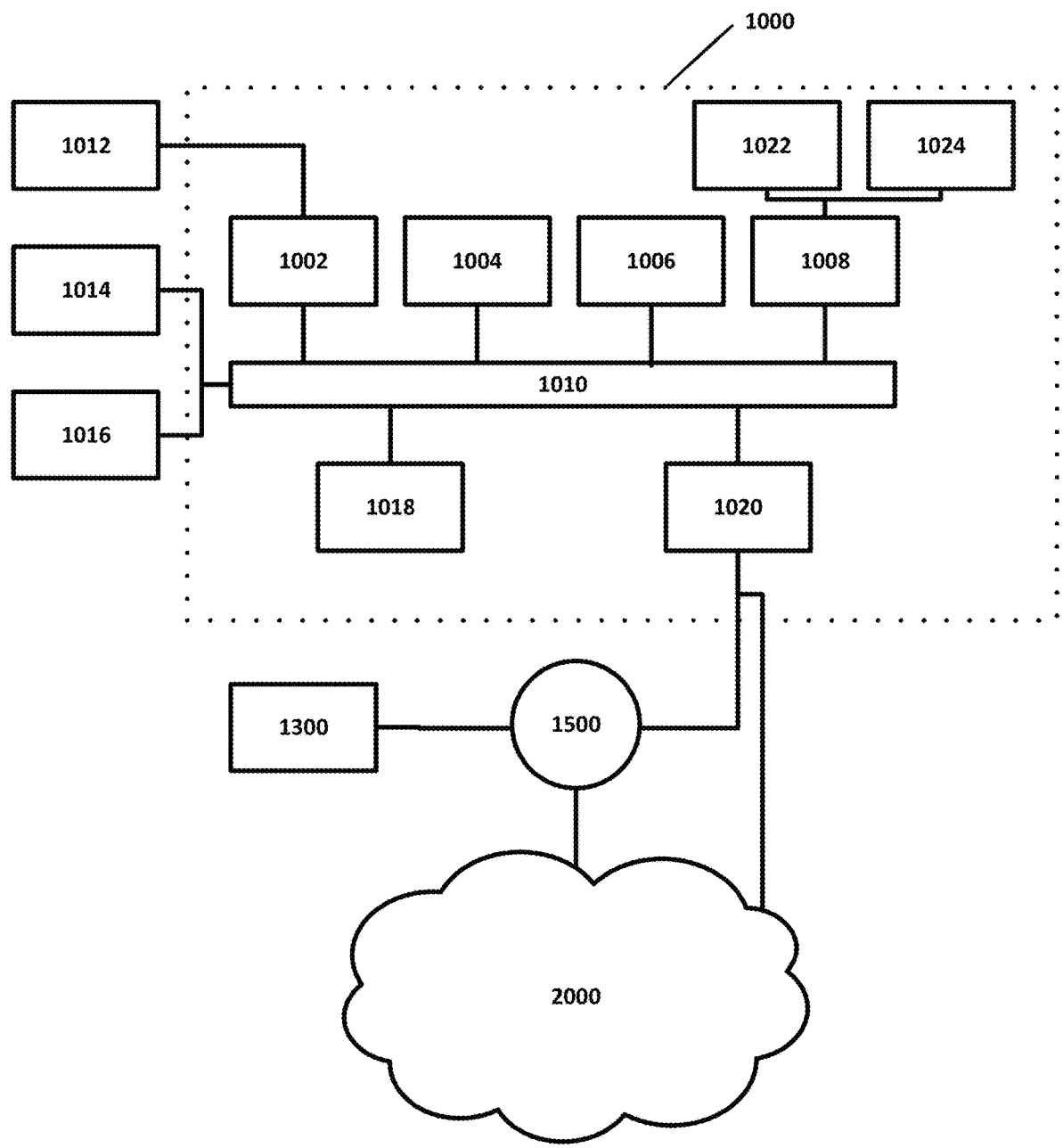
FIG. 6 is a schematic diagram showing a hardware architecture of a computing system.

FIG. 3 is a diagram of a device 2 having within its image capture field of view a region of interest ROI containing a physical artifact PA, and in communication with a server 4 via a network 2000. FIG. 4 is a diagram of device 2 having approached the physical artifact PA and having with its image capture field of view a segment SROI_1 of the region of interest ROI of FIG. 3. In this embodiment, the segment SROI_1 is represented by a graphical indication that is a rectangular box. The rectangular box would be displayed on device 2 for the user to see. FIG. 5 is a diagram of device 2 having further approached the physical artifact PA and having within its image capture field of view another segment SROI_2 of the segment SROI_1 of the region of the interest ROI of FIG. 4. In this embodiment, the segment SROI_2 is represented by a graphical indication that is a rectangular box. The rectangular box that would be displayed on device 2 for the user to see. It can be seen that as a user responds to the instruction presented on device 2 at successive iterations of image capture, the device 2 is brought physically closer to the physical artifact in order to capture the segment as at high a resolution as possible using device 2.

To validate the validation process described above, Perceptual Hash (phash) checks have been conducted to determine a score corresponding to the closeness of the scene and object digital images. Such checks have generally been found to correlate with the feature and homography checks described above, in that higher phash scores have manifested in the event that a physical artifact has been confirmed.

Phash validations or confirmatory validations can be useful where it is generally the case that one can expect an identical bit-for-bit digital image to be found within another image, such as in the case of digital copying. However, perturbations such as background information in a digital image capture can throw off a phash. In an embodiment, data is captured during validations that can be used for adding to the digital fingerprint. In this way, a digital fingerprint itself can continue to evolve to take into account gradual changes in the physical artifact due to age or changes due to damage. However, because a physical artifact may physically evolve in a way that a purely digital asset would not, comparing unprocessed phashes based on images of physical artifacts captured at different times and under different conditions can easily produce false negatives. As such, to account for this, the processes described herein for using features for validation may be conducted, and then once the physical artifact has been validated, a modified phash may be produced.

For example, in an embodiment, intermediate outputs of feature processing may be used to, as described above, determine a valid homography between digital scene and object images. For example, a homography may be applied to ensure the object features correspond to respective scene features, with the matching trapezoid constraints detailed above. The trapezoid is then cropped to leave some trim area in four corners outside of the trapezoid region while showing scene data. The homography is then recalculated and re-applied with the cropped trapezoid region back to the object thereby to un-skew the object digital image. Trimming is conducted again to result in a skew-adjusted matching common area across both scene and object digital images.

It will be appreciated that, while to the human eye these modified scene and object digital images are virtually identical, they will incorporate differences in how the object was digitized by the sensor. The contrast profile, however, will be substantially the same. At this point, the two so-transformed digital images can be phashed, such that each digital image has an associated hash value in the form of a string, hex string or binary value. A phash score can thereafter be calculated by calculating a Hamming distance between the two strings. In particular, by summing the 1's that result when the hash value is XOR'd. The Hamming distance provides a score as to how different the two digital images are, and the inverse of this score is how similar the two digital images are. It will be appreciated that the phash score in this circumstance should be relatively high because the images are feature matched too, and matched/skewed/un-skewed/trimmed to be the same region.

It will be appreciated that the data encoded in the images of the image capture set(s), as well as the data encoded about the relationships between the images in an image capture set, function as the unique digital fingerprint of a physical artifact. While this data is fixed once captured, it is not flattened from its multi-image, multiple-relationship format into a sort of fixed, single-file set of pixels or some other flattened representation. Such a flattening would be at a higher risk of filtering out data useful for distinguishing a reproduction from an original. Rather, in the present description, image pixel data captured during iterations of image capture is primarily preserved, as are the relationships between segments. In this way, a candidate physical artifact can be captured in similar manners to capture data encoded in images at different iterations and about relationships between the images in a candidate image capture set, and can be feature-compared at different "levels" of the iterations, rather than at only a flattened level.

Furthermore, by preserving the data encoded in the images of the image capture set(s) and the relationships between the images in an image capture set for the purpose of digital fingerprinting, validation as described herein may be made more resilient to changes in a physical artifact that may occur over time due to age or due to damage to the physical artifact.

FIG. 3 is a schematic diagram showing a hardware architecture of a computing system 1000. Computing system 1000 is suitable as the hardware platform for the device such as a smartphone having an image capture device, or any of the server(s) that, in embodiments, process captured digital images.

A particular computing system 1000 may be specially configured with software applications and hardware components to enable the capturing, edit, processing, and display of media such as digital images, as well as to encode, decode and/or transcode the digital media according to various selected parameters, thereby to compress, decompress, view and/or manipulate the digital media as desired.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, other kinds of input devices such as radar/sonar, front and/or rear cameras, infrared sensors, ultrasonic sensors, LiDAR (Light Detection and Ranging) sensors, and other kinds of sensors.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user (e.g., for controlling mixing of live-streams of audio and video and other media). Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), object-oriented programming (OOP) modules such as classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetric digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing systems may be used to implement the systems and processes described herein.

Electronic data stores implemented in the database described herein may be one or more of a table, an array, a database, a structured data file, an XML file, or some other functional data store, such as hard disk 1022 or removable media 1024.

Although embodiments have been described, those of skill in the art will appreciate that variations and modifications may be made without departing from the spirit, scope and purpose of the invention as defined by the appended claims.

For example, the process of creating a unique digital fingerprint may be used for the creation or maintenance of non-fungible tokens (NFTs), registries, registrations, or the like, that uniquely represent physical artifacts or that uniquely represent sub-sections, a fractionalized region or regions, or areas of physical artifacts. For example, a unique digital fingerprint generated as described herein could be encapsulated as an NFT or in association with an NFT, and used as a token for trading in, for example, an online marketplace.

It will be appreciated that the processes described herein enable the creation of a unique digital fingerprint of a physical artifact in a manner that facilitates reliable and validation of the physical artifact. Such validation may be done by a different person each time using the processes described herein, facilitating the reliable authentication of physical artifacts without requiring a human expert or system of experts to do so. In this way, transacting (i.e., buying, selling, transferring ownership, receiving, shipping, transporting, loaning, registering viewing of, checking-in, and other forms of transacting) unique physical artifacts can be done without requiring human intermediaries, facilitating transacting with confidence and at lower cost, and of unique physical artifacts of various values.

It will be appreciated that an expert human authenticator is required to marshal his or her memory of having seen the physical artifact before, or to have an understanding of other physical artifacts made by the same creator, in order to authenticate a physical artifact in any subsequent instance.

Human memory is fallible, and an expert human authenticator may no longer be available or may not be available at a time when authentication is desired. Furthermore, an expert human authenticator is not necessarily able to objectively track how close or far a loupe is from a given physical artifact, so is not able to convey to anyone else an amount of detail being registered with a given glance through a loupe.

The processes described herein enable the capture and permanent storage of impartial digital fingerprint data that can be accessed from any remote location, as it may be made available in a public database such as a block chain or a more centralized database.

It will be appreciated that the processes described herein may be used in conjunction with current owner, location, and transaction information tracking in connection with a particular physical artifact. In this way, subsequent—or secondary market—transactions can be registered so that, if desired, an original creator of the physical artifact or another designated party, may be compensated for transactions happening subsequent to an initial sale.

It will be appreciated that validations can be conducted at the time of a transaction, to ratify the transaction, and/or may be conducted between transactions in order to secure modified digital fingerprint information as the physical artifact itself evolves. This may also be done in order to confirm a current owner and/or location in case an original creator or other designated party wishes to keep track of this information. For example, an artist or other designated party may wish to keep track of the current location and current owner of an original painting. Furthermore, such interim validations may be useful for leveraging improvements in image capture technologies for capturing more and more information about a given physical artifact.

While embodiments described herein are applicable to two-dimensioned physical artifacts such as paintings and drawings, embodiments are also applicable to three-dimensional physical artifacts such as sculptures. In order to create a unique digital fingerprint of a three-dimensional physical artifact, images captured of a physical artifact may be mapped to 3D space using multiple frames in succession. The iterative image capture process could then occur while information about the surface of the physical artifact or the perspective in 3D space in respect of the physical artifact is associated with the given captured digital image.

It will be appreciated that the processes described herein obviate the requirement for a separate physical appendage such as a QR code or hologram to be placed on—or otherwise associated with—the physical artifact, in order to validate the physical artifact as unique.

It will be appreciated that, while embodiments herein include capture and processing of digital images, in other embodiments sensors other than image capture sensors may be used to capture features of a physical artifact in a region of interest, such as features discernable through physical contact by sensors with the physical artifact, and/or features discernable through physical reflection of light and/or radiofrequency waves, or other reflective phenomena. Such sensors other than image capture sensors may produce data indicative of the physical features discerned by touch, reflection of light and/or radiofrequency waves or other reflective phenomena, with such data having sufficient richness for enabling processes such as those described herein to discern features and/or clusters of features. Such sensors other than image capture sensor, and the captured data, may be used instead of, or in conjunction with, data from one or more image capture devices as described herein.

While embodiments have been described with particular pixel dimensions, this has been done for illustrative purposes. Implementations using other pixel dimensions are possible.

CLAUSES

Clause 1. A method comprising: capturing, by a device, a current digital image of a region of interest containing a physical artifact; and presenting, by the device, an instruction to capture a next digital image of a segment of the region of interest, the instruction comprising a graphical indication of the segment generated based on the current digital image.

Clause 2. The method of clause 1, wherein the capturing and presenting are conducted during an image capture session, the method comprising, during the image capture session: capturing, by the device, the next digital image; and associating the next digital image with the current digital image.

Clause 3. The method of clause 1, wherein the capturing and presenting are conducted during an image capture session, the method comprising, during the image capture session: repeating, at least once, the capturing and presenting with the next digital image being treated as the current digital image.

Clause 4. The method of clause 1, wherein the graphical indication of the segment is a graphical representation of the segment.

Clause 5. The method of clause 1, wherein the graphical indication of the segment is an outline of a respective portion of the current digital image.

Clause 6. The method of clause 1, comprising: transmitting the current digital image to a server; and receiving, from the server, data corresponding to the graphical indication of the segment.

Clause 7. The method of clause 6, comprising: generating, by the server, the data corresponding to the graphical indication of the segment.

Clause 8. The method of clause 7, wherein the generating comprises: processing the current digital image to identify at least one high entropy area ("hotspot") in the current digital image, wherein the data corresponding to the graphical indication of the segment identifies one hotspot.

Clause 9. The method of clause 7, wherein the generating comprises: processing the current digital image to identify at least one low entropy area ("coldspot") in the current digital image, wherein the data corresponding to the graphical indication of the segment identifies one coldspot.

Clause 10. The method of clause 6, wherein the data corresponding to the graphical indication of the segment is digital image data.

Clause 11. The method of clause 6, wherein the data corresponding to the graphical indication of the segment is data defining dimension and position of the graphical indication of the segment with respect to the current digital image.

Clause 12. The method of clause 1, comprising: automatically disabling an image zoom function of the device.

Clause 13. The method of clause 1, wherein the instruction comprises an instruction for a user to capture the next digital image of a segment of the region of interest by physically approaching the region of interest.

Clause 14. The method of clause 1, comprising: receiving, by the device, in association with the current digital image, physical dimensions of a physical object in the region of interest.

Clause 15. The method of clause 1, wherein the capturing and presenting are conducted during an image capture session, the method comprising, during the image capture session: repeating the capturing with the next digital image being treated as the current digital image; and presenting, by the device, an indication that the image capture session has ended.

Clause 16. The method of clause 1, comprising: generating a unique digital fingerprint of the physical artifact within the region of interest based at least on the contents of the current and the next digital images.

Clause 17. The method of clause 1, comprising: based at least on the contents of the current and next digital images, determining whether the physical artifact within the region of interest matches with a unique digital fingerprint of the physical artifact.

Clause 18. A method comprising: receiving, from a device, a current digital image captured of a region of interest containing a physical artifact; generating, based on the current digital image, data corresponding to a graphical indication of a segment of the region of interest; and transmitting, to the device, the data corresponding to the graphical indication of the segment for use by the device to present an instruction to capture a next digital image of the segment of the region of interest.

Clause 19. The method of clause 18, wherein the generating comprises: processing the current digital image to identify at least one high entropy area ("hotspot") in the current digital image, wherein the data corresponding to the graphical indication of the segment identifies one hotspot.

Clause 20. The method of clause 18, wherein the generating comprises: processing the current digital image to identify at least one low entropy area ("coldspot") in the current digital image, wherein the data corresponding to the graphical indication of the segment identifies one coldspot.

Clause 21. The method of clause 20, wherein the data corresponding to the graphical indication of the segment is digital image data.

Clause 22. The method of clause 18, wherein the data corresponding to the graphical indication of the segment is data defining dimension and position of the graphical indication of the segment with respect to the current digital image.

Clause 23. The method of clause 18, wherein the method is conducted to generate a unique digital fingerprint of the physical artifact within the region of interest.

Clause 24. The method of clause 18, wherein the method is conducted to determine whether the physical artifact within the region of interest matches with a unique digital fingerprint of the physical artifact.

Clause 25. A non-transitory computer readable medium embodying a computer program executable on a device, the computer program comprising computer program code for executing the method of one of clauses 1 to 6, and 10 to 17.

Clause 26. A non-transitory computer readable medium embodying a computer program executable on a server, the computer program comprising computer program code for executing the method of one of clauses 7 to 9, and 18 to 24.

What is claimed is:

1. A method for creating a unique digital fingerprint for a physical artifact, the method comprising:
capturing, by a device, a current digital image of a region of interest containing the physical artifact;
transmitting, by the device, the current digital image to a server, the server generating data corresponding to a graphical indication of a segment by processing the current digital image to identify at least one high entropy area or low entropy area, wherein the graphical indication of a segment identifies the location of the identified at least one high entropy area or low entropy area;
receiving, by the device from the server, the data corresponding to the graphical indication of the segment; and
presenting, by the device, an instruction to capture a next digital image of only a segment of the region of interest captured in the current digital image, the instruction guiding a user to re-position the device closer to the physical artifact thereby to obtain a higher-resolution capture of the segment in the next digital image, the instruction comprising the graphical indication of the segment generated based on the current digital image.

2. The method of claim 1, wherein the capturing, transmitting, receiving and presenting are conducted during an image capture session, the method comprising, during the image capture session:
capturing, by the device, the next digital image; and
associating the next digital image with the current digital image.

3. The method of claim 1, wherein the capturing, transmitting, receiving and presenting are conducted during an image capture session, the method comprising, during the image capture session:
repeating, at least once, the capturing and presenting with the next digital image being treated as the current digital image.

4. The method of claim 1, wherein the graphical indication of the segment is a graphical representation of the segment.

5. The method of claim 1, wherein the graphical indication of the segment is an outline of a respective portion of the current digital image.

6. The method of claim 1, wherein the data corresponding to the graphical indication of the segment is digital image data.

7. The method of claim 1, wherein the data corresponding to the graphical indication of the segment is data defining dimension and position of the graphical indication of the segment with respect to the current digital image.

8. The method of claim 1, comprising:
automatically disabling an image zoom function of the device.

9. The method of claim 1, wherein the instruction comprises an instruction for a user to capture the next digital image of a segment of the region of interest by physically approaching the region of interest.

10. The method of claim 1, comprising:
receiving, by the device from a user, in association with the current digital image, physical dimensions of a physical object in the region of interest.

11. The method of claim 1, wherein the capturing, transmitting, receiving and presenting are conducted during an image capture session, the method comprising, during the image capture session:
repeating the capturing and transmitting with the next digital image being treated as the current digital image;
receiving, from the server, an indication that the image capture session has ended; and
presenting, by the device, an indication that the image capture session has ended.

12. The method of claim 1, comprising:
generating the unique digital fingerprint of the physical artifact within the region of interest based at least on the contents of the current and the next digital images.

13. At least one non-transitory computer readable medium embodying a computer program executable on a device, the computer program comprising computer program code for executing the method of claim 1.

14. A method of authenticating a physical artifact within a region of interest in a capture image by determining whether the physical artifact can be matched with a unique digital fingerprint generated by the method of claim 1, the method comprising during the authenticating:
- capturing, by a device, a current digital image of a region of interest containing the physical artifact;
- transmitting, by the device, the current digital image to a server;
- deploying, by the server, a feature detection process which attempts to locate the presence of an object digital image, corresponding to the physical artifact being checked for validation, within a scene digital image, corresponding to a capture image represented by at least the current and next digital images of the region of interest and the segment, respectively, that had been captured during the creation of the unique digital fingerprint of the authentic artifact.

15. The method of claim 14, further comprising the step of presenting during the authenticating, by the device, an instruction to capture a next digital image of only a segment of the region of interest captured in the current digital image during the authenticating, the instruction guiding a user during the authenticating to re-position the device closer to the physical artifact thereby to obtain a higher-resolution capture of the segment in the next digital image, the instruction comprising a graphical indication of the segment generated based on the current digital image.

16. The method of claim 15, wherein the capturing, transmitting and presenting are conducted during an image capture session of the authenticating, the method comprising, during the image capture session of the authenticating, repeating the capturing with the next digital image being treated as the current digital image.

17. The method of claim 14, wherein the graphical indication of the segment is at least one of:
- a graphical representation of the segment; and
- an outline of a respective portion of the current digital image.

18. A non-transitory computer readable medium embodying a computer program executable on a server, the computer program comprising computer program code for executing the method of claim 14.

* * * * *